Nov. 1, 1927.
A. P. BRANT ET AL
SPEED INDICATING DEVICE
Filed April 2, 1926
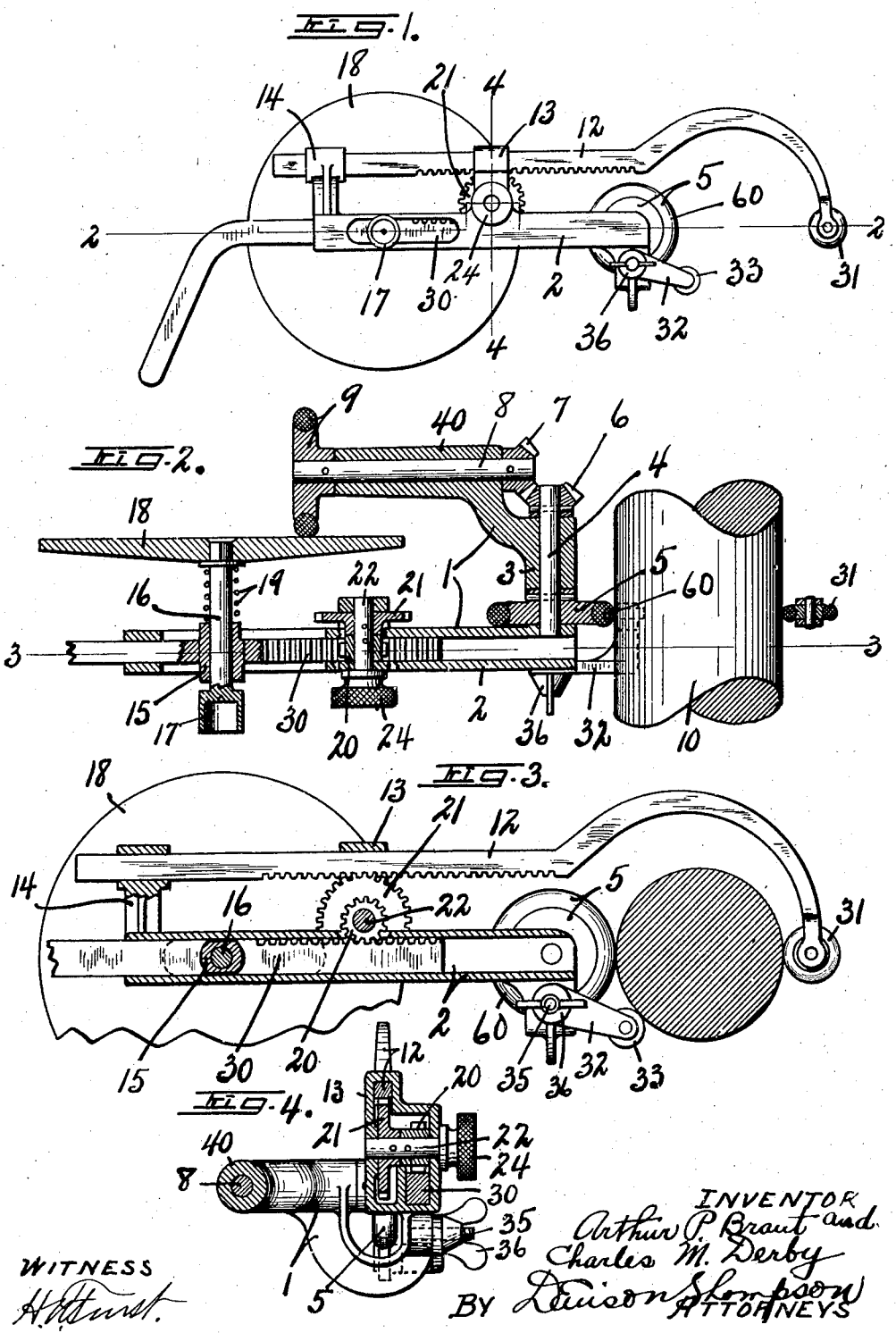

Patented Nov. 1, 1927.

1,647,500

UNITED STATES PATENT OFFICE.

ARTHUR P. BRANT AND CHARLES M. DERBY, OF LITTLE VALLEY, NEW YORK.

SPEED-INDICATING DEVICE.

Application filed April 2, 1926. Serial No. 99,246.

This invention relates to certain new and useful improvements in speed indicating devices for rotary shafts and the like.

It is quite easy and appliances are now available for indicating the speed of shafts by the application of such appliances to the end of the shaft, but where the end of the shaft is not exposed, or is otherwise unavailable for that purpose, it has been extremely difficult to determine the rotary speed of a shaft, and the main object of this invention is the production of a speed-indicating device applicable to an intermediate portion of a shaft, and by means of which the speed of a shaft may be readily indicated by the use of a usual device applicable to the free end of a shaft, and this result is effected by driving a secondary or measuring shaft at the speed of or at a speed proportional to the speed of the shaft of which the speed is to be determined, the measuring shaft having a free end available for the application of a usual speed indicator.

Other objects and advantages relate to the details of the structure and the form and relation of the parts thereof, all as will more fully appear from the following description, taken in connection with the accompanying drawings, in which:

Figure 1 is a side elevation of a device of this invention.

Figure 2 is a section on line 2—2, Figure 1.

Figure 3 is a section on line 3—3, Figure 2.

Figure 4 is a section on line 4—4, Figure 1.

The device as here illustrated, comprises a frame —1— including a longitudinally extending tubular part —2—, within which the rack —30— is slidably positioned. Bearing —3— extends laterally from the tubular part —2— and bearing —40— extends rearwardly at substantially right angles from the bearing —3—.

Shaft —4— is journaled in the bearing —3— and carries near one end a friction wheel —5— which may be formed with a rubber or other similar rim —60— if desired. Bevel gear —6— is mounted on the other end of shaft —4— and is adapted to mesh with cooperating bevel gear —7— pinned to the forward end of shaft —8— journaled in bearing —40—. The rear end of shaft —8— carries a friction wheel —9— preferably of the same diameter as the wheel —5— and secured to the shaft for simultaneous rotation in any suitable manner, as by pin. The friction wheel —5— constitutes one of the jaws adapted to engage a shaft —10—, the speed of which is to be measured, and this jaw, altho free to rotate is fixed so far as movement independently of frame —1— toward and from the shaft —10— is concerned. A movable jaw —31— is provided which may, as shown, terminate in a rotary member or wheel —12—, if desired, altho that is not essential. The jaw —31— is carried by a longitudinally movable rack —12— slidable in brackets —13— and —14— carried by the tubular part —2— of the frame —1—. The rack —30— carries a laterally-extending tubular bearing —15— within which shaft —16— is slidably and rotatably journaled, said shaft being formed at one end with a part —17— for receiving an ordinary speed indicator, and provided at its opposite end with a friction disk —18—, spring —19— being interposed between the friction disk and the bearing —15— so as to normally hold the friction disk in contact with the circumferential portion of the friction wheel —9—.

The racks —30— and —12— are adapted to be simultaneously driven in opposite directions by means of gears —20— and —21— respectively, the gear —21— being of a diameter twice as great as the diameter of the gear —20— whereby the rack —12— is shifted longitudinally a distance twice as great as the distance of movement of the rack —30— when said gears are simultaneously rotated by means of shaft —22— to which the gears are secured as by pins.

The shaft —22— is journaled in the opposite sides of the bracket —13— and is adapted to be manually rotated by thumb piece —24—.

The racks —12— and —30— are initially so positioned that the distance between the jaws —5— and —31— equals twice the distance between the center of the friction disk —18— and the point of contact of the friction wheel —9— with said disk. In other words, the radius of the circle defined upon the disk —18— by friction wheel —9— when rotated is equal to the radius of a shaft with which the jaws —5— and —31— are in diametrical contact.

It will be obvious, therefore, that upon rotation of a shaft —10— to be measured, rotary movement will be transmitted to the friction wheel —5— and through shafts —4—, gears —6— and —7— and shaft —8— will be transferred to the friction disk —9— at the same speed at which friction wheel —5— rotates. In view of the fact that the radius of the circle defined on disk —18— by friction wheel —9— is equal to the radius of the shaft —10— movement will be transmitted to the friction disk —18— and shaft —6— at the same rotary speed as the speed of rotation of shaft —10—. As the end of shaft —16— is readily available for the application of a usual speed indicator, its speed can be readily determined by known instruments, and thereby one may determine the speed of the shaft —10—, which is the same as the speed of the shaft —16—.

The structure of this invention can be readily applied to the intermediate portion of any shaft, and it is only necessary to apply the jaws —5— and —31— tightly to a shaft, the speed of which is to be determined, in diametrical positions by rotation of shaft —22— by thumb nut —24—. The speed of shaft —10— will then be accurately indicated by an ordinary speed indicator applied to the free end of shaft —16—.

Additional means may be provided for holding the jaws engaged with the shaft in diametric relation in the form of an angular bracket —32— carrying contact member or roller —33— adapted to engage the shaft. This bracket may be mounted upon a journal —35— extending outwardly from the frame —1— and having its outer end threaded for receiving thumb nut —36— by which the bracket is held in any of its adjusted positions with the contact member engaging the surface of the shaft.

Altho we have shown and described a specific structure and form and relation of the parts thereof as illustrative of a present preferred embodiment of the invention, we do not desire to restrict ourselves to the details of the structure or the exact form and relation of the parts thereof, as various changes may be made within the scope of the appended claims.

We claim:

1. In a speed indicating device, a pair of jaw elements adapted to be disposed diametrically upon opposite sides of a shaft, the speed of which is to be measured, a measuring shaft, and means for driving the measuring shaft from one of the jaw elements.

2. In a speed indicating device, a pair of jaw elements adapted to be disposed diametrically upon opposite sides of a shaft, the speed of which is to be measured, a measuring shaft, and means for driving the measuring shaft from one of the jaw elements at a speed equal to the speed of the shaft to be measured.

3. In a speed indicating device, a pair of jaw elements adapted to be disposed diametrically upon opposite sides of a shaft, the speed of which is to be measured, a friction disk, means for driving said friction disk from one of the jaw elements, and a measuring shaft driven by the friction disk.

4. In a speed indicating device, a pair of jaw elements adapted to be disposed diametrically upon opposite sides of a shaft, the speed of which is to be measured, a friction disk, a friction wheel adapted to contact with said friction disk, means for driving said friction wheel from one of the jaw elements, and a measuring shaft driven by the friction disk.

5. In a speed indicating device, a pair of jaw elements adapted to be disposed diametrically upon opposite sides of a shaft, the speed of which is to be measured, a friction disk, a friction wheel adapted to contact with said friction disk, means for driving said friction wheel from one of the jaw elements, a measuring shaft driven by the friction disk, and means for varying the position of the friction wheel radially of the friction disk as the distance between the jaws is varied.

6. In a speed-indicating device, a pair of jaw elements adapted to be disposed diametrically upon opposite sides of a shaft, the speed of which is to be measured, a sliding rack carrying one of said jaw elements, a second sliding rack, a shaft journaled in the second sliding rack, a friction disk mounted on said shaft, a friction wheel adapted to contact with the friction disk, means for driving said friction wheel from one of said jaw elements, and means for moving said racks simultaneously.

7. In a speed-indicating device, a pair of jaw elements adapted to be disposed diametrically upon opposite sides of a shaft, the speed of which is to be measured, a sliding rack carrying one of said jaw elements, a second sliding rack, a shaft journaled in the second sliding rack, a friction disk mounted on said shaft, a friction wheel adapted to contact with the friction disk, means for driving said friction wheel from one of said jaw elements, and means for simultaneously sliding said racks.

8. In a speed indicating device, a pair of jaw elements adapted to be disposed diametrically upon opposite sides of a shaft, the speed of which is to be measured, a sliding rack carrying one of said jaw elements, a second sliding rack, a shaft journaled in the second sliding rack, a friction disk mounted on said shaft, a friction wheel adapted to contact with the friction disk, means for driving said friction wheel from one of said jaw elements, means for simultaneously sliding said racks, and spring means for holding the friction disk in contact with the friction wheel.

9. In a speed indicating device, a frame, a pair of jaw elements carried by the frame, a sliding rack for moving one of said jaw elements with respect to the other, the other jaw element being in the form of a friction wheel, a second friction wheel, means for driving said second friction wheel from and at the speed of the first-named friction wheel, a second rack slidable on the frame, a shaft journaled in the second rack, a friction disk carried by said shaft and adapted to contact with the second named friction wheel, means for simultaneously moving said racks.

10. In a speed indicating device, a frame, a pair of jaw elements carried by the frame, a sliding rack for moving one of said jaw elements with respect to the other, the other jaw element being in the form of a friction wheel, a second friction wheel, means for driving said second friction wheel from and at the speed of the first-named friction wheel, a second rack slidable on the frame, a shaft journaled in the second rack, a friction disk carried by said shaft and adapted to contact with the second named friction wheel, gears meshing with respective racks, and means for simultaneously rotating said gears to shift said racks to thereby simultaneously vary the spaced distance of the jaw elements and the point of contact of the friction wheel with the friction disk.

11. A pair of jaw elements adapted to be disposed diametrically upon opposite sides of a shaft, one of said jaw elements including a rotary member adapted to be driven by the shaft, a measuring shaft and a driving connection between said measuring shaft and said rotary member including a friction disk and a friction wheel, and means for effecting a relative adjustment of the friction wheel and disk radially of the latter in accordance with the spaced distance of the jaw elements.

12. A pair of jaw elements adapted to be disposed diametrically upon opposite sides of a shaft, one of said jaw elements including a rotary member adapted to be driven by the shaft, a measuring shaft and a driving connection between said measuring shaft and said rotary member including a friction disk and a friction wheel, and means for effecting a relative adjustment of the friction disk and friction wheel radially of the disk simultaneously with movement of the jaw elements toward or from each other.

In witness whereof we have hereunto set our hands this 29th day of March, 1926.

ARTHUR P. BRANT.
CHARLES M. DERBY.